US007889858B2

(12) United States Patent
Hamilton, II et al.

(10) Patent No.: US 7,889,858 B2
(45) Date of Patent: *Feb. 15, 2011

(54) METHOD AND SYSTEM FOR TELEPHONE WAIT USER INTERFACE SELECTION

(75) Inventors: Rick Allen Hamilton, II, Charlottesville, VA (US); Carl Phillip Gusler, Austin, TX (US); Timothy Moffett Waters, Richmond, VA (US); Harry Schatz, McLean, VA (US)

(73) Assignee: International Business Machines Corporation, Armonk, NY (US)

( * ) Notice: Subject to any disclaimer, the term of this patent is extended or adjusted under 35 U.S.C. 154(b) by 984 days.

This patent is subject to a terminal disclaimer.

(21) Appl. No.: 11/477,154

(22) Filed: Jun. 28, 2006

(65) Prior Publication Data

US 2007/0258577 A1  Nov. 8, 2007

Related U.S. Application Data

(62) Division of application No. 10/755,827, filed on Jan. 12, 2004, now Pat. No. 7,092,510.

(51) Int. Cl.
*H04M 3/00* (2006.01)
(52) U.S. Cl. .................... 379/266.01; 379/88.18; 379/88.19; 379/201.02; 379/265.01
(58) Field of Classification Search .......... 379/266, 379/269, 226.01, 266.04, 265.13, 203.01, 379/88.11; 705/1
See application file for complete search history.

(56) References Cited

U.S. PATENT DOCUMENTS 5,040,208 A   8/1991   Jolissaint (Continued)

FOREIGN PATENT DOCUMENTS

WO   WO0201271 A1   1/2002

OTHER PUBLICATIONS

U.S. Appl. No. 12/135,325, filed Jun. 9, 2008, Confirmation No. 3537.

(Continued)

*Primary Examiner*—Curtis Kuntz
*Assistant Examiner*—Phung-Hoang J Nguyen
(74) *Attorney, Agent, or Firm*—Schmeiser, Olsen & Watts; William H. Steinberg

(57) ABSTRACT

In the method of the present invention, a customer of a service provider would be placed in hold while waiting to speak to a customer service representative. The method and system of the invention would recognize the telephone number of the caller using a "caller ID" system. If this call is the first time the caller has ever called, the caller would be presented with an audible listing of listening choices that would include but not be limited to the latest news, the weather (of the caller's location), financial headlines, or a selection of music stations (via cable radio, for example). The caller would then speak or type his/her preference into the keypad and the selection would be played. If the caller does not like the selection, the caller can then speak another selection or type the new selection as many times as the caller prefers. The caller selection is recorded in a caller preference database. Finally, when the same customer calls one or more additional times, the system would retain the caller's number and preferred listening selection, based on caller ID value. The listening selection would automatically be played on subsequent calls.

13 Claims, 5 Drawing Sheets

U.S. PATENT DOCUMENTS

| | | | | |
|---|---|---|---|---|
| 5,185,782 | A * | 2/1993 | Srinivasan | 379/210.01 |
| 5,311,574 | A | 5/1994 | Livanos | |
| 5,440,615 | A | 8/1995 | Caccuro et al. | |
| 5,533,102 | A | 7/1996 | Robinson et al. | |
| 5,841,852 | A | 11/1998 | He | |
| 5,875,231 | A | 2/1999 | Farfan et al. | |
| 6,038,292 | A | 3/2000 | Thomas | |
| 6,122,346 | A | 9/2000 | Grossman | |
| 6,122,347 | A | 9/2000 | Borland | |
| 6,163,607 | A * | 12/2000 | Bogart et al. | 379/266.01 |
| 6,173,053 | B1 * | 1/2001 | Bogart et al. | 379/266.01 |
| 6,178,240 | B1 | 1/2001 | Walker et al. | |
| 6,301,354 | B1 | 10/2001 | Walker et al. | |
| 6,314,178 | B1 * | 11/2001 | Walker et al. | 379/266.01 |
| 6,351,279 | B1 | 2/2002 | Sawyer | |
| 6,400,804 | B1 | 6/2002 | Bilder | |
| 6,425,012 | B1 * | 7/2002 | Trovato et al. | 709/227 |
| 6,529,586 | B1 | 3/2003 | Elvins et al. | |
| 6,678,365 | B1 | 1/2004 | Kinoshita | |
| 6,704,412 | B1 * | 3/2004 | Harris et al. | 379/269 |
| 6,842,767 | B1 | 1/2005 | Partovi et al. | |
| 7,092,510 | B2 | 8/2006 | Hamilton, II et al. | |
| 7,415,417 | B2 * | 8/2008 | Boyer et al. | 705/1 |
| 7,426,268 | B2 * | 9/2008 | Walker et al. | 379/266.01 |

OTHER PUBLICATIONS

Office Action (mail date Apr. 1, 2005) for U.S. Appl. No. 10/755,827, Filing Date Jan. 12, 2004, Confirmation No. 9822.

Jun. 30, 2005 Amendment to Office Action filed in response to Office Action (mail date Apr. 1, 2005) for U.S. Appl. No. 10/755,827, Filing Date: Jan. 12, 2004, Confirmation No. 9822.

Office Action (mail date Sep. 20, 2005) for U.S. Appl. No. 10/755,827, Filing Date Jan. 12, 2004, Confirmation No. 9822. .

Dec. 20, 2005 Amendment to Office Action filed in response to Office Action (mail date Apr. 1, 2005) for U.S. Appl. No. 10/755,827, Filing Date: Jan. 12, 2004, Confirmation No. 9822.

Office Action (mail date Mar. 8, 2006) for U.S. Appl. No. 10/755,827, Filing Date Jan. 12, 2004, Confirmation No. 9822.

Mar. 28, 2006 Amendment to Office Action filed in response to Office Action (mail date Apr. 1, 2005) for U.S. Appl. No. 10/755,827, Filing Date: Jan. 12, 2004, Confirmation No. 9822.

Notice of Allowance (Mail May 25, 2006) for U.S. Appl. No. 10/755,827, Filing Date Jan. 12, 2004, Confirmation No. 9822.

* cited by examiner

```
1 - News Headlines
2 - Financial News
3 - Local Weather
4 - Country Music
5 - Gospel Music
6 - Jazz Music
7 - Local News
8 - Sports News
```

FIG. 1

| 713 | | 972 | | 215 | | 646 | |
|---|---|---|---|---|---|---|---|
| • 771.8330 | 2 | • 377.9221 | 4 | • 944.1285 | 7 | • 112.3456 | 8 |
| • 459.9901 | 6 | • 456.7890 | 3 | • 987.8877 | 4 | • 236.8765 | 8 |
| • 672.1365 | 1 | • 246.8024 | 2 | • 285.7088 | 5 | • 665.4095 | 1 |

METHOD AND SYSTEM FOR TELEPHONE WAIT USER INTERFACE SELECTION

CROSS-REFERENCE TO RELATED APPLICATION

This application is a divisional application of and claims priority from patent application Ser. No. 10/755,827, filed on Jan. 12, 2004 now U.S. Pat. No. 7,092,510, the contents of which are incorporated herein by reference.

FIELD OF THE INVENTION

This invention relates to a telephone answering method and system that entertains callers placed on hold and more particularly to a telephone answering method and system that identifies callers and provides listening options from which a caller can choose while the caller is waiting to complete a call. The present invention further relates to method and system for storing the caller's listening preference for future calls.

BACKGROUND OF THE INVENTION

Telephone-based customer service plays an increasingly important role for organizations involved in activities requiring direct communication with customers. In order to serve a maximum number of callers, call centers are typically designed to optimize call handling efficiency and telephone attendant productivity.

An Automatic Call Distributor (ACD) is commonly utilized by call centers to enhance attendant productivity. An ACD allows a call center to cost-effectively handle a large number of calls by placing some of the calls in a holding queue when no attendants are available to take the telephone call. When a call is placed in the holding queue, a greeting message identifying the called party is typically played to the caller, indicating that the next available attendant will service the call.

Call queuing plays an important role in call center operations and provides many advantages to the call center, including increased attendant productivity, by minimizing idle time for the attendant, simultaneous handling of a greater number of calls during an increase in calls, and encouragement of callers to wait for an available attendant, as opposed to requiring the caller to attempt another call in response to a busy signal.

In spite of the benefits to the call center, call queuing, however, is perceived by the customers as a waste of their time, and may result in frustration, abandoned calls, a loss of business, and poor customer satisfaction when the customer deems the holding time to be excessive. Thus, in order to distract the callers such that their focus is not on the amount of time they are waiting in the queue, many call centers incorporate various activities to entertain callers waiting in a call queue. For example, many call centers play music, news, weather or advertising messages to the caller during the holding period. In this manner, the caller may be entertained or informed of sales promotions for particular products or services. For example, U.S. Pat. No. 5,444,774 to Friedes discloses an Interactive Queuing System For Call Centers and suggests that music or advertising messages may be played to a caller on hold.

Conventional systems for entertaining callers placed on hold by a call center do permit a caller to select a desired entertainment option. The technology now exists where call centers can provide a caller with a number of valuable entertainment options while the caller is on hold. This technology would enable an increase in caller satisfaction and tolerance of excessive hold times would increase.

U.S. Pat. No. 6,178,240 to Walker et al, provides a system for entertaining a caller placed in a queue of a call center. A method is disclosed that allows the caller to access a plurality of entertainment options while on hold. The entertainment options permit the caller to (i) place a call to a third party while on hold; or (ii) access one or more premium entertainment services while on hold. A PBX/ACD receives the calls destined for the call center, and queues the calls when an appropriate attendant is not available. An IVRU prompts a caller for specific information and forwards the collected information to the PBX/ACD. The IVRU provides the caller with a menu of available entertainment options, which can be accessed, by the caller while the caller is on hold. The PBX/ACD establishes a connection between the caller and the selected entertainment service. The call is then transferred to an available attendant with any data that may be required to process the call.

U.S. Pat. No. 6,400,804 provides an on-hold activity selection apparatus and method that allows an on-hold party to select an on-hold activity, from a menu of on-hold activities, with which to be entertained and/or informed. The on-hold activity selection apparatus detects the occurrence of an on-hold condition in a communication between a first party terminal and a second party terminal. In response to detecting the on-hold condition, the on-hold activity selection apparatus provides a menu of available on-hold activities to the terminal, which is placed on-hold. If a reply is received from the on-hold terminal identifying a selected on-hold activity, the on-hold activity selection apparatus then provides the on-hold terminal with the selected activity. The menu of available on-hold activities may be based on profile information, corresponding to the on-hold terminal, stored in a database. The on-hold activities may include listening to music, advertisements, sports, news, viewing television broadcasts, graphical presentations, prerecorded video messages, reading textual messages, playing video games, browsing the Internet, and the like. The on-hold activities may include live feeds and/or prerecorded activities.

Various other proposals have surfaced in the past for dealing with the on-hold problem. One proposal is for the receiving telephone system to provide the caller with an estimated hold-time until an agent will answer that call. While this information may be helpful where the wait will be relatively short, a caller informed of a long wait might not have the time to remain on the telephone for that long a period, and so may simply hang up in frustration and come away with the feeling of being unimportant to the commercial concern.

Another proposal has been to provide the caller with the opportunity to schedule a return call from the commercial enterprise. Such a proposal is undesirable from a customer service perspective in that it fails to recognize that the timing of the initial call is already based on the convenience of the caller. Any other time is likely not as convenient and thus represents a compromise; an unacceptable compromise in those cases where the timeliness of the call is critical, such as for airline scheduling and the like. Such a scheduled callback approach also raises privacy issues for those callers who prefer not to leave their name and/or phone number merely to request information. At bottom, such systems may suggest to the caller that he should not have called when he did, even though that was the time when the consumer was motivated, and able, to call.

Another system has been proposed in which the calling party has the ability to interrupt the on-hold status of the receiving telephone to alert the nearby agent to return to the phone. Such a remote on-hold termination system is of little value to consumers put on-hold automatically upon receipt of their call, or where no agent is readily available when alerted.

Almost everyone that has used a telephone has been put on hold. In the age of reduced customer service personnel, the "on hold" time can be quite lengthy. During this hold time, the caller is obliged to listen to whatever type of "on hold" music or chatter that has been chosen by the called company, and that choice can be grating or of marginal utility to the caller. There remains a need for a method and system for selecting an audio user interface for telephone hold time and a mechanism for recalling a user's preference, once such an interface has been chosen.

SUMMARY OF THE INVENTION

It is an objective of the present invention to provide a method and system of listening options for callers placed on hold during a telephone call.

It is a second objective of the present invention to provide a listening option to a caller based on the caller's previous preferences.

It is a third objective of the present invention to provide a database of caller identifications and the listening preferences of the caller when that particular caller is placed on hold.

It is a fourth objective of the present invention to provide at least two methods of user selection of a particular listening option.

In the method of the present invention, a customer of a service provider would be placed in a hold queue while waiting to speak to a customer service representative. The method of the present invention would recognize the telephone number of the caller using a "caller ID" system. If this happens to be the first time the customer has ever called in, the caller would be presented with an audible listing/menu of listening choices that would include but not be limited to the latest news, the weather (of the caller's location), financial headlines, or a selection of music stations (via cable radio, for example). The caller would then speak or type his/her preference into the keypad and the selection would be played for that caller. If the caller does not like the selection, the caller can then speak another selection or type the new selection as many times as the caller prefers. Finally, when the same customer calls again, the system would retain the caller's number and preferred listening selection, based on caller ID value. The listening selection would automatically be played on subsequent calls.

In the implementation of the present invention, first, a customer calls a particular service provider and gets placed in a wait queue. A Caller ID process identifies the number from which the call was made and references the caller's telephone number with the customer DB to determine if this call is the first time the customer has called the service provider. If so, the system will begin playing the preferred selection stored in the customer's DB. If this call is the first call for a customer, then the customer is presented with several listening options. Examples of listening options presented to the caller in this invention, include but are not limited to news headlines from commercial providers, e.g., CNN; financial headlines received from Bloomberg or other such services; various musical selections from cable radio or other licensed outlets; and local weather forecasts based on the home address of the customer as identified from the customer DB. Using a well-defined speech recognition system and/or a well-defined telephone tone ID system, the customer/caller makes a selection after listening to the options on the telephone receiver. The customer can either speak the listening option or press the appropriate button on the touch-tone telephone to select the desired listening option.

Once the selection is made, it is played for the caller's listening pleasure. At the same time, the selection is stored in the customer's DB to be used on subsequent calls to the service provider. Various algorithms could be used to determine the customer's listening preference based on frequency of selection or simply based on last selection made on previous call. In addition, if the caller wishes they could depress the star button (or any other such key) on the keypad or speak "new selection" to pick an alternative listening station or preference.

The present invention has the following features and advantages:

(1) This invention provides multiple channels available per user listening preference, e.g. classical, jazz, news, headlines, pop rock, or silence for the hold time experience.

(2) This invention enables the user to continue to "change the channel" while on hold (3) The invention permits two methods of user selection: either keypad or speech recognition.

(4) This invention provides a method of preference retention, based on caller identification value.

(5) This invention provides a method whereby subsequent calls to that service telephone number would remember the user preference and play the stated preference.

The present invention would reduce a caller's level of agitation and make the "on hold" time a little more enjoyable.

DESCRIPTION OF THE DRAWINGS

FIG. 1 is an example of an index of listening options from which callers place on hold can select.

FIG. 3 illustrates an example of a caller preference database containing listening options for callers that are placed on hold.

DETAILED DESCRIPTION OF THE INVENTION

The present invention is a method and system that provides listening options for callers waiting on hold to complete the call. In this method, once the caller has made a call and it is necessary to put the caller on hold, the caller will receive a list of listening options from which to choose. Referring to FIG. 1, shown is an example of a list of listening options. The list of listening options can very with each particular configuration of the present invention.

Figure 2:
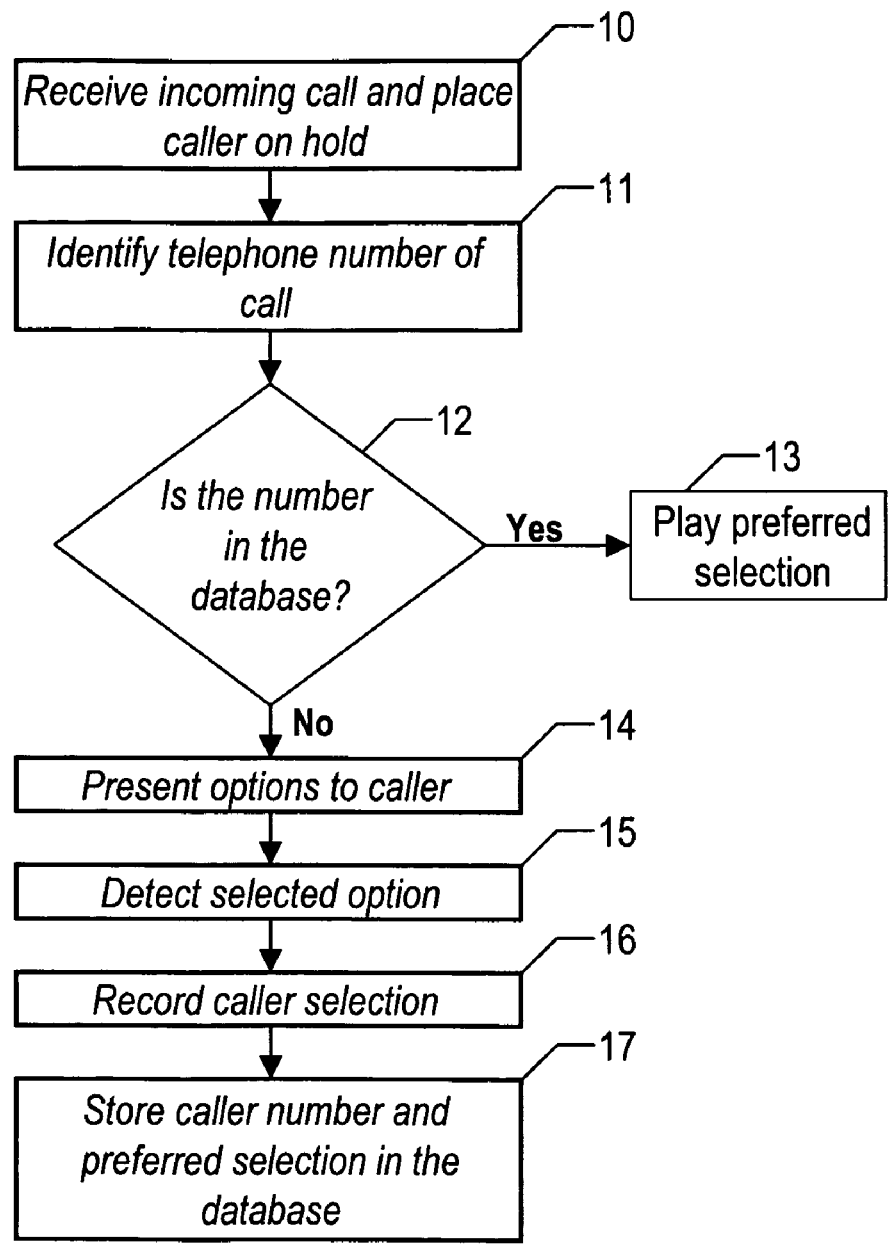
FIG. 2 is a flow diagram illustrating the basic steps in the method of the present invention, which a caller is placed, on hold.

Referring to FIG. 2, the method of the invention is activated by the receipt of a call and the placing of the caller in an on hold state in step 10. During this step, first there is a determination of whether it is necessary to place the incoming call in an on-hold state. If it is not necessary to place the call in the on-hold state, the call will go through, the caller will be connected and the caller can conduct whatever business that is the subject of the call. However, as previously mentioned, in many instances, it is necessary to place the incoming call in an on-hold state. After the caller is placed in an on-hold (wait) state, step 11 identifies the telephone number of the caller. This identification step can be by any conventional caller identification means. Step 12 determines whether the number of the call is in the listener database. In this step, the process performs a search of listener preference database to determine if the number from which the call is places is caller has an existing listening preference.

Referring to FIG. 3, shown is an example of a listener preference database. This database contains a list of previous callers that have made listening selections while the caller was in the on hold state. The present invention recorded each selection and stored the selection along with the caller's telephone number for reference when that caller makes another call and it is necessary to place that caller on hold. In the database shown in FIG. 3, the telephone numbers are stored based on the area code of the telephone number. In this example, there are four area codes with numbers stored under each code. Each entry in the database comprises a record 20, with fields 21, 22 and 23. Field 21 can be a link to the area code of the telephone number. Field 22 (exchange.extension code) is the actual telephone number and field 23 is the listener preference from the prior calls. As shown, the listener preference can be a code for one of the options shown FIG. 1.

Referring again to FIG. 2, if the determination in step 12 is that the caller number is listen in the database, the process moves to step 13 where that preference for that caller is retrieved from field 23 of the record for that telephone number and played for the particular caller. If in step 12, the determination is that the caller's number is not in the database, the process moves to step 14 where the caller is presented with a set of listening options such as those listed in FIG. 1. In this step 14, the caller will receive a list of listening options. The caller can speak or input his/her listening preference into the telephone. Step 15 will detect the listening preference selected by the caller. At this point, step 16 will record the caller selection. In step 17, the caller preference is stored in the database. This preference information will include the telephone number of the caller and the caller preference. Following the storing of the information in step 17, the process moves to step 13 where the selected material is played for the caller.

Figure 4:
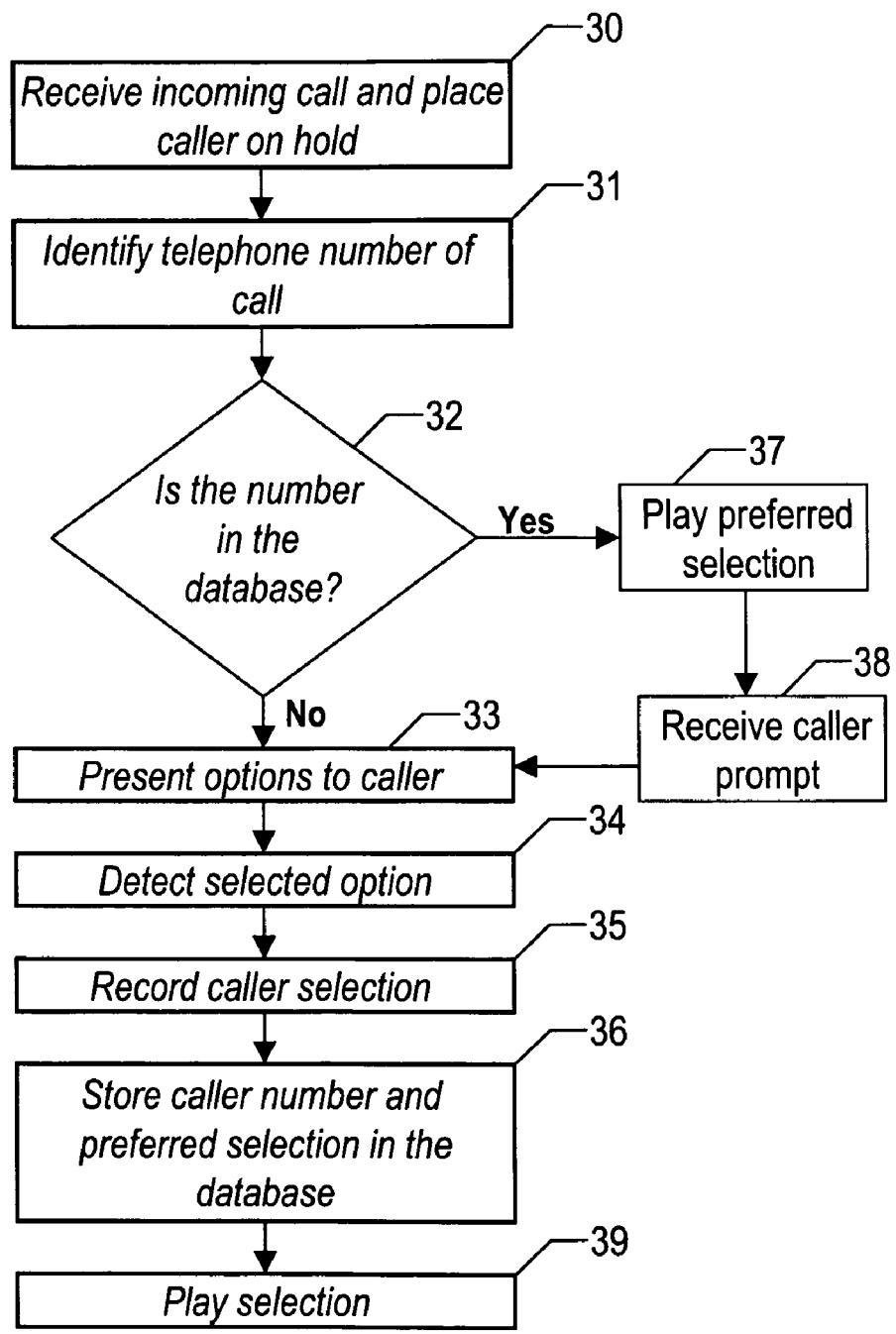
FIG. 4 is a flow diagram illustrating an alternate implementation of the method of the present invention.

FIG. 4 shows an alternate embodiment of the present invention in which the caller wants to change his/her listening preference. In some of these instances, the caller already has a preference stored in the listener database. In other cases, the caller may want to change a current selection after listening to that selection for some period of time. In this method, the first steps 30, 31 and 32 are the same as steps 10, 11 and 12 in FIG. 2. In addition, steps 33, 34, 35 and 36 are the same as steps 14, 15, 16 and 17. In step 32, if the determination is that the caller has a listening preference in the database, the process will retrieve that preference, step 37. However, during the retrieval of that selection, if the caller desires to change the listening preference, the caller can activate a change selection request by pressing the star key on the telephone. Other identified keys can also service in this capacity. The pressing of the star key will send a signal to the process in step 38 that the caller wants to change the current selection. Once the process receives the prompt indicating that the caller wants to change selections, the process returns to step 33.

In this step 33, the caller will receive/hear a list/menu of listening options. Step 34 will detect the listening preference selected by the caller. Step 35 will record the caller selection. In step 36, the caller preference is stored in the database. Following the storing of the information in step 36, the process moves to step 39 where the selected material is played for the caller.

Figure 5:
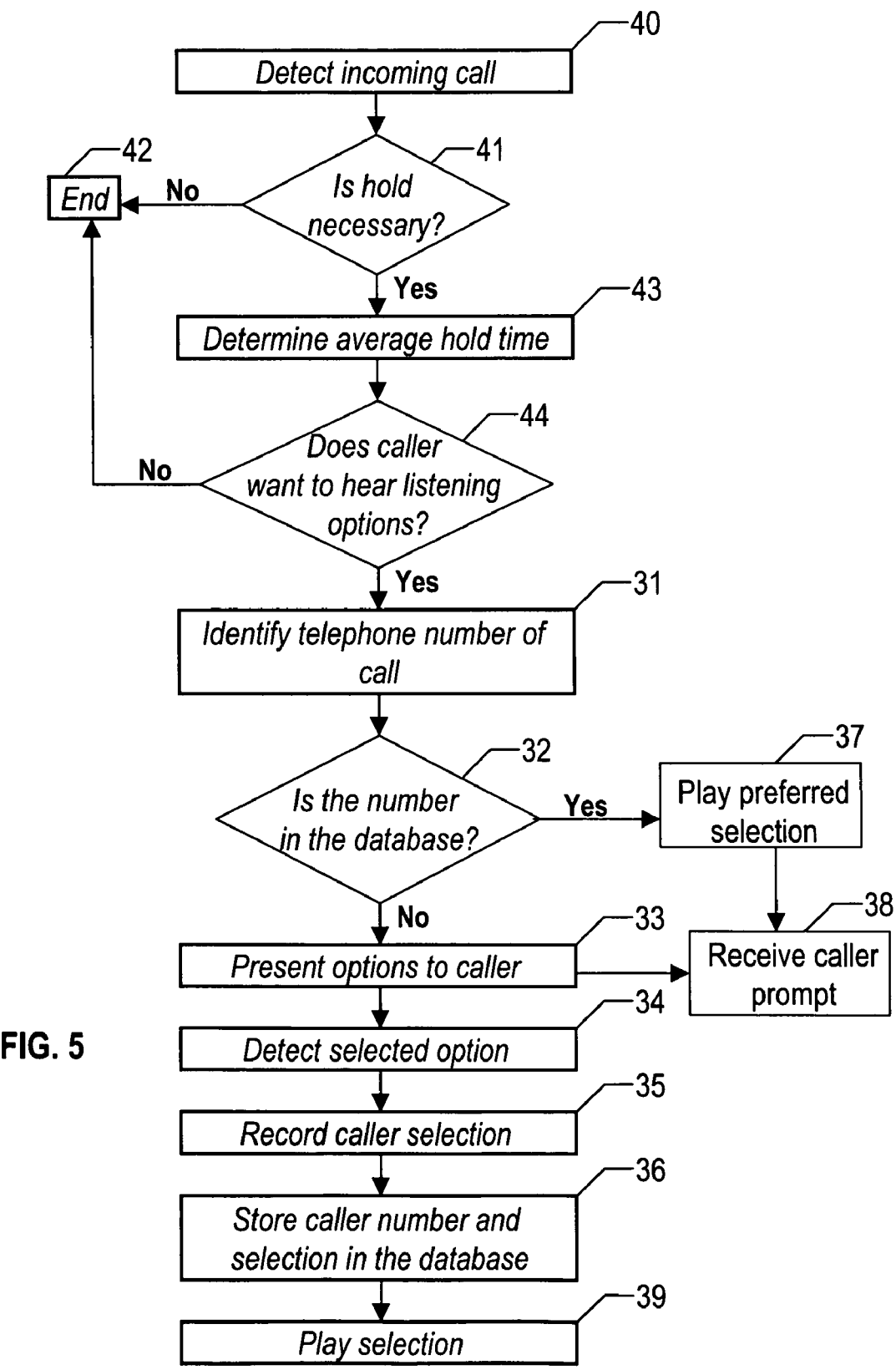
FIG. 5 is a flow diagram illustrating a second alternate implementation of the method of the present invention.

Referring to FIG. 5, shown is an alternate method of the present, which expands out the methods described in FIGS. 3 and 4. For the purpose of discussion, the method of FIG. 5 modifies FIG. 4 to show initial steps in the method of the invention. In step 40, the receipt of a telephone call activates the process. Step 41 determines whether it is necessary to place the call in a hold state. This determination is based on whether there is a customer service person currently available to answer the received call. If a customer service person is available, the call is sent to that available person and this process ends in step 42. If a customer service person is not available to answer the call, the process moves to step 43, which determines the average hold time for a caller before someone can answer their call. Current techniques can determine the average hold time for a caller. Also the average hold time can be recalculated at predetermined intervals. At this point, the caller is informed of the hold time and is given the option to hear information from various subject categories, step 44. If the caller desires to hear a listening option, the process moves to step 31 of FIG. 4 or 11 in FIG. 3 and proceed as previously discussed.

In addition to the listening options shown in FIG. 1, after step 43, the caller may have the option to remain in the queue, but hang up and be called back when there is a customer service representative to answer the call. This option could be made available, if the hold time was over a minimum threshold of time. Another option could be silence, if the caller does not want to listen to anything. This silence option can be included in the list of options in FIG. 1.

Figure 6:
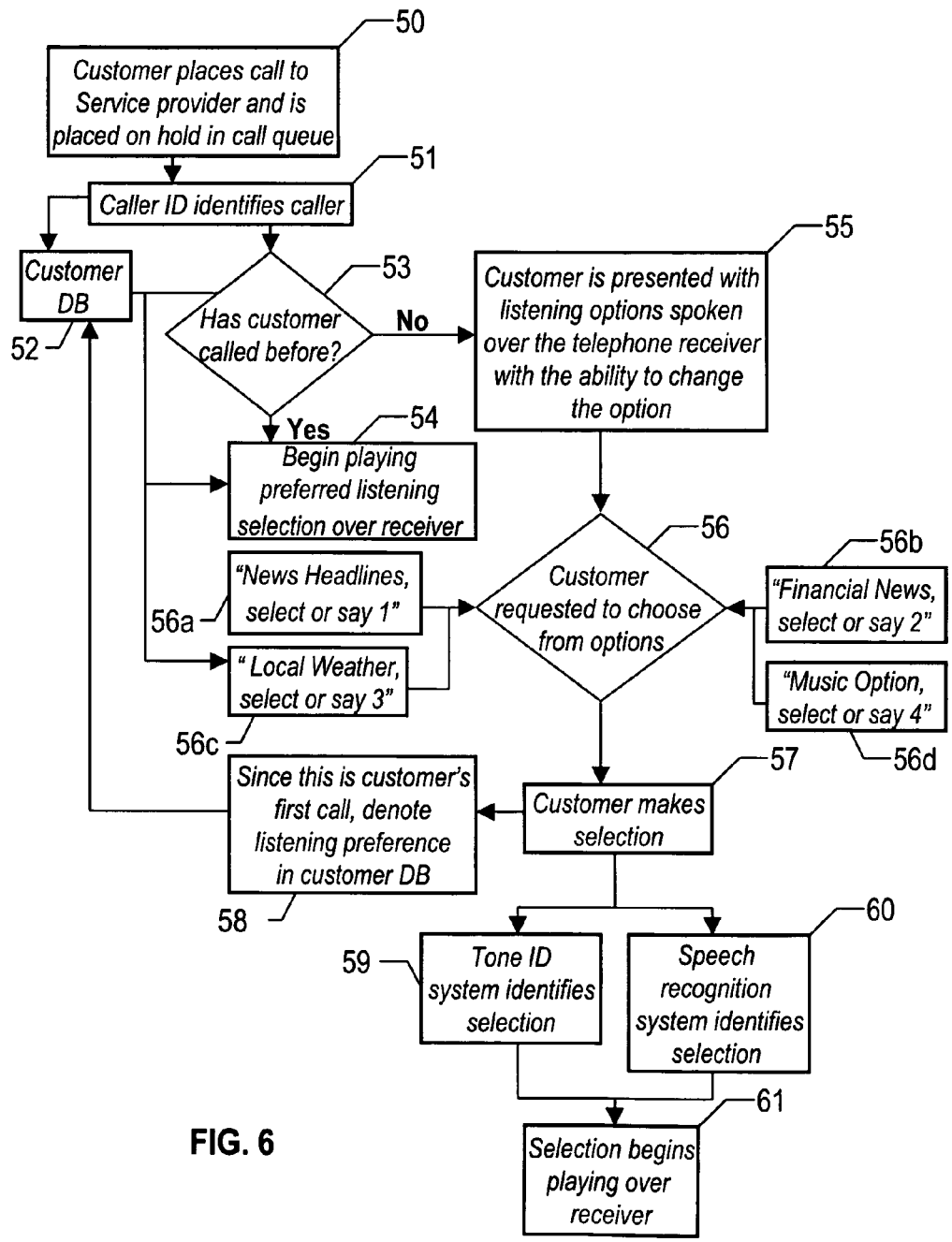
FIG. 6 is a flow diagram illustrating a detailed implementation of the method of the present invention.

FIG. 6 is a detailed description of the steps of the present invention. As shown in step 50, the customer places a call to the service provider and is placed in an on hold queue. Step 51 identifies the telephone number of the caller. The identified number is checked against the numbers in the customer database in step 52. This check will serve to determine if the customer has previously called the service provider in step 53. If the caller has previously called, the process begins playing the customers preferred listening selection over the customer's receiver in step 54. If in step 53, there is determination that the customer has not made a previous call to the service provider, step 55 presents the customer with listening options from FIG. 1. These options are spoken over the telephone receiver with the customer having the ability to change the option. Once the options are presented to the customer, step 56 gives the customer the option to select one of the listening categories. In this diagram, the listening options are "News Headlines" 56a, "Financial News" 56b, "Local Weather" 56c or "Country Music" 56d. In step 57, the customer makes a selection. At this point, step 58 sends this selection to the customer database. Since this call is the customer's first call, this selection is recorded in the customer database in the record with the customer telephone number. As shown in boxes 59 and 60, the listening option selection process can be a Tone Identification system 59 or a Speech Recognition system 60. As with the previous embodiments, step 61 begins to play the selection over the receiver of the caller's telephone.

It is important to note that while the present invention has been described in the context of a fully functioning data processing system, those skilled in the art will appreciate that the processes of the present invention are capable of being distributed in the form of instructions in a computer readable medium and a variety of other forms, regardless of the particular type of medium used to carry out the distribution.

Examples of computer readable media include media such as EPROM, ROM, tape, paper, floppy disc, hard disk drive, RAM, and CD-ROMs and transmission-type of media, such as digital and analog communications links.

We claim:

1. A method for creating a caller preference database for use in determining a listening preference of a caller, comprising the steps of:
   receiving a call from the caller;
   identifying the telephone number of the call;
   determining whether it is necessary to place the caller in a hold queue;
   determining whether the caller desires to hear listening options while in the hold queue;
   when the caller desires to hear the listening options, determining whether the identified telephone number is currently in the database, and when the determination is that the identified telephone number is currently in the database, determining whether a listener with the identified telephone number currently in a listeners' record in the database desires to make changes to currently existing listener choices in the listeners' record and storing the changes in the listeners' record;
   when the caller desires to hear the listening options and the identified telephone number is not currently in the database, creating a record for the identified telephone number, the record comprising fields for the area code of the identified telephone number, the identified telephone number, and the listening preference of the caller;
   presenting the listening options to the caller;
   detecting a listening option selected by the caller from the presented listening options;
   recording the listening option selected by the caller in a caller listening preference field of the created record;
   storing the created record in the database in a location based on the area code of the identified telephone number, the database having a set of sub-directories based on the exchange and extension code of the telephone numbers of callers and the listening options; and
   repeating said steps for each newly identified telephone number of received calls.

2. A method for creating a caller preference database for use in determining a listening preference of a caller, said method comprising:
   receiving a call from the caller to a service provider;
   identifying the telephone number of the call;
   presenting listening options to the caller while the caller is in the hold queue;
   detecting a listening option selected by the caller from the presented listening options;
   creating a record for the identified telephone number, the record comprising fields for the area code of the identified telephone number, the identified telephone number, and a listening preference of the caller;
   recording the listening option selected by the caller in the field for the listening preference of the caller in the created record; and
   storing the created record in the database in a location based on the area code of the identified telephone number, the database having a set of sub-directories based on the exchange and extension code of the telephone numbers of callers and the listening options.

3. The method of claim 2, said method further comprising:
   determining that the call is the first call from the caller to the service provider,
   wherein said presenting listening options to the caller while the caller is in the hold queue is performed in response to said determining that the call is the first call from the caller to the service provider.

4. The method of claim 2, said method further comprising:
   repeating said receiving, said identifying, said placing, said presenting in response to said ascertaining, said detecting, said creating, said recording, and said storing for each newly identified telephone number of received calls.

5. The method of claim 2, said method further comprising:
   after said storing the created record, receiving a second call from the caller;
   identifying the telephone number of the second call;
   determining that it is necessary to place the caller in a hold queue;
   determining that the caller desires to hear listening options while in the hold queue;
   in response to said determining that the caller desires to hear listening options while in the hold queue, determining that the identified telephone number is currently in the stored record in the database; and
   in response to said determining that the identified telephone number is currently in the stored record in the database, playing a listening activity in the receiver of the caller while the caller is in the hold queue, said listening activity based on the recorded listening option.

6. A physically tangible computer readable storage medium storing computer-readable program instructions configured to be executed in a data processing system to implement a method for creating a caller preference database for use in determining a listening preference of a caller, said method comprising:
   receiving a call from the caller to a service provider;
   identifying the telephone number of the call;
   presenting listening options to the caller while the caller is in the hold queue;
   detecting a listening option selected by the caller from the presented listening options;
   creating a record for the identified telephone number, the record comprising fields for the area code of the identified telephone number, the identified telephone number, and a listening preference of the caller;
   recording the listening option selected by the caller in the field for the listening preference of the caller in the created record; and
   storing the created record in the database in a location based on the area code of the identified telephone number, the database having a set of sub-directories based on the exchange and extension code of the telephone numbers of callers and the listening options.

7. The medium of claim 6, said method further comprising: determining that the call is the first call from the caller to the service provider, wherein said presenting listening options to the caller while the caller is in the hold queue is performed in response to said determining that the call is the first call from the caller to the service provider.

8. The medium of claim 6, said method further comprising:
   repeating said receiving, said identifying, said placing, said presenting in response to said ascertaining, said detecting, said creating, said recording, and said storing for each newly identified telephone number of received calls.

9. The medium of claim 6, said method further comprising:
   after said storing the created record, receiving a second call from the caller;
   identifying the telephone number of the second call;

determining that it is necessary to place the caller in a hold queue; determining that the caller desires to hear listening options while in the hold queue;

in response to said determining that the caller desires to hear listening options while in the hold queue, determining that the identified telephone number is currently in the stored record in the database; and in response to said determining that the identified telephone number is currently in the stored record in the database, playing a listening activity in the receiver of the caller while the caller is in the hold queue, said listening activity based on the recorded listening option.

10. A data processing system, comprising a computer and a physically tangible computer readable storage medium storing computer-readable program instructions configured to be executed by the computer to implement a method for creating a caller preference database for use in determining a listening preference of a caller, said method comprising:

receiving a call from the caller to a service provider;

identifying the telephone number of the call;

presenting listening options to the caller while the caller is in the hold queue;

detecting a listening option selected by the caller from the presented listening options;

creating a record for the identified telephone number, the record comprising fields for the area code of the identified telephone number, the identified telephone number, and a listening preference of the caller;

recording the listening option selected by the caller in the field for the listening preference of the caller in the created record; and storing the created record in the database in a location based on the area code of the identified telephone number, the database having a set of sub-directories based on the exchange and extension code of the telephone numbers of callers and the listening options.

11. The data processing system of claim 10, said method further comprising:

determining that the call is the first call from the caller to the service provider, wherein said presenting listening options to the caller while the caller is in the hold queue is performed in response to said determining that the call is the first call from the caller to the service provider.

12. The data processing system of claim 10, said method further comprising:

repeating said receiving, said identifying, said placing, said presenting in response to said ascertaining, said detecting, said creating, said recording, and said storing for each newly identified telephone number of received calls.

13. The data processing system of claim 10, said method further comprising:

after said storing the created record, receiving a second call from the caller;

identifying the telephone number of the second call;

determining that it is necessary to place the caller in a hold queue;

determining that the caller desires to hear listening options while in the hold queue;

in response to said determining that the caller desires to hear listening options while in the hold queue, determining that the identified telephone number is currently in the stored record in the database; and in response to said determining that the identified telephone number is currently in the stored record in the database, playing a listening activity in the receiver of the caller while the caller is in the hold queue, said listening activity based on the recorded listening option.

* * * * *